(12) United States Patent
Kubbar

(10) Patent No.: US 6,801,537 B1
(45) Date of Patent: Oct. 5, 2004

(54) ADAPTIVE CONTENTION ALGORITHM BASED ON TRUNCATED BINARY EXPONENTIAL BACK-OFF

(75) Inventor: Osama M. Kubbar, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 820 days.

(21) Appl. No.: 09/657,155

(22) Filed: Sep. 7, 2000

(51) Int. Cl.[7] .............................................. H04B 7/212
(52) U.S. Cl. ........................ 370/442; 370/442; 370/252; 370/725; 370/114
(58) Field of Search ................................ 370/352, 252, 370/420, 421, 486, 489, 490, 493, 442; 375/222; 725/111, 112, 113, 109, 110, 114

(56) References Cited

U.S. PATENT DOCUMENTS 6,529,520 B1 * 3/2003 Lee et al. .................... 370/442

OTHER PUBLICATIONS

Data–Over–Cable Service Interface Specification, Radio Frequency Interface Specification SP–RFIv1.1–I02–99073, pp. 1–316, Copyright 1999 Cable Television Laboratories, Inc.

* cited by examiner

*Primary Examiner*—Douglas W. Olms
*Assistant Examiner*—Robert W. Wilson

(57) ABSTRACT

A method of adaptively resolving contentions in a digital communication system is provided. A headend, such as a Base station Transceiver System, transmits a Media Access Control message to Customer Premise Equipment units. The Media Access Control message includes information on the current load on shared transmission resources. The Customer Premise Equipment units implement a truncated binary exponential back-off algorithm for requests. However if the current load on the transmission resources is low enough, the Customer Premise Equipment units reduce the back-off times of backlogged requests to allow them to take advantage of the low load. The headend may also maintain a table of service flows and their levels of activity. If the level of activity at shared transmission resources falls below a threshold, the headend determines from the table which service flows are likely to have backlogged requests. The headend transmits a unicast-type signal identifying the service flow, and the Customer Premise Equipment unit managing the identified service flow transmits the backlogged request.

35 Claims, 3 Drawing Sheets

ADAPTIVE CONTENTION ALGORITHM BASED ON TRUNCATED BINARY EXPONENTIAL BACK-OFF

FIELD OF THE INVENTION

This invention relates to digital communication systems, and more particularly to contention resolution within such systems.

BACKGROUND OF THE INVENTION

In a communication system based on dynamic bandwidth allocation and in which multiple users have access to shared transmission resources, such as a transmission channel, contention can arise amongst users attempting to access the shared transmission resources simultaneously. Such communication systems require a robust contention resolution algorithm to resolve contentions between users in order to provide Quality of Service guarantees, to maximize bandwidth utilization, and to provide system stability. If users request access to a shared resource simultaneously, a contention arises and packets from the users will collide. Each user whose transmitted packet collides with other packets must randomly determine a back-off time during which the user will not attempt to re-access the shared resource.

The Data-Over-Cable Service Interface Specification (DOCSIS 1.1), incorporated by reference herein, is a communication protocol designed for high-speed packet-based communications over cable television communication networks, but which can also form the basis of wireless communication systems. At the user end of the communication system a headend is linked to several Customer Premises Equipment units (CPEs) through several communication links. The headend acts as a distribution hub into a wide area network for the CPEs to which it is linked. Each CPE may manage more than one service flow. In a cable television communication network the headend, communication link, and CPE are a Cable Modem Termination System (CMTS), a coaxial cable, and a Cable Modem (CM) respectively. In a wireless communication network the headend, communication link, and CPE are a Base station Transceiver System (BTS), a radio channel, and a mobile unit respectively. In a fixed wireless access communication system the headend, communication link, and CPE are a BTS, a radio channel, and a remote unit respectively.

Under DOCSIS 1.1, the headend transmits Bandwidth Allocation Map (MAP) messages on a regular basis to all CPEs to which it is linked. A MAP message is a Media Access Control management message that the headend uses to announce and allocate transmission opportunities to the CPEs. Each MAP message includes a number of Information Elements (IEs), a Data Backoff Start field, and other fields specified by DOCSIS 1.1. The Data Backoff Start field defines an initial back-off window for use in a contention resolution algorithm. Each IE defines an interval of transmission time and includes an interval usage code that identifies the type of transmission which may be transmitted by a CPE during the interval. One type of IE is a Request IE, which is used by the headend to announce an interval in which CPEs may transmit a request for bandwidth for upstream data transmission. The Request IE may have a Service ID of type unicast, in which case only the CPE managing a service flow specified in the Request IE may transmit a request during the interval, and the request must be for the specified service flow. The Request IE may alternatively have a Service ID of type broadcast, in which case any CPE may transmit a request during the interval, for any service flow. If a CPE receives a broadcast-type Request IE in a MAP message and wishes to transmit a request, the CPE calculates a random offset based on the Data Backoff Start field of the MAP message. After expiry of the random offset the CPE transmits a request for bandwidth for a data-transmission for a service flow. The request indicates the number of bytes remaining in the transmission queue of the service flow. The random offset is necessary to minimize request collisions between different CPEs transmitting requests in response to the same broadcast-type Request IE. When the headend receives the request, the headend attempts to schedule the requested data transmission within the interval between transmission of the next two MAP messages (the next MAP period). If the requested data transmission can be accommodated within the next MAP period, the headend alerts the CPE that the request was granted using a Data Grant IE in the next MAP message. If the request for transmission cannot be accommodated within the next MAP period, the headend alerts the CPE that the request is pending using a zero length Data Grant IE (referred to as a Data Grant Pending IE) in the next MAP message. When the headend receives a request from a CPE, the head unit must send either a Data Grant IE or a Data Grant Pending IE to the CPE in the subsequent MAP message.

If the Request IE is of type broadcast, then any CPE may transmit a request to the headend. If requests from more than one CPE arrive at the headend simultaneously, the requests will collide. All of the requests will be lost, unless the headend is implementing a capture effect in which case all but one request will be lost. The headend does not detect the lost requests, and is therefore unable to send a Data Grant IE or Data Grant Pending IE to a CPE whose request was lost. When a CPE does not receive a Data Grant IE or a Data Grant Pending IE in the MAP message subsequent to the transmission of the request, the CPE realizes that a contention arose and that its request was lost. According to the truncated binary exponential back-off algorithm, which is required-by DOCSIS 1.1, the CPE must increase its back-off window by a factor of two. The CPE calculates a new random offset within the new back-off window, and after a number of contention transmission opportunities (each of which is identified by one broadcast-type Request IE) equal to the random offset has elapsed, the CPE may respond to a new broadcast-type Request IE by re-sending the request for bandwidth for upstream data transmission. The CPE continues this contention resolution method until it receives a Data Grant IE or Data Grant Pending IE, a maximum number of retries have been attempted (at which point the packet of data is discarded), or the CPE receives a unicast-type Request IE (in which case it must use the explicit transmission opportunity offered and defined by the unicast-type Request IE).

Each CPE may manage more than one service flow, and will transmit a request for each service flow which uses contention resolution. Contentions may result in more than one request from a CPE being lost, in which case a contention resolution algorithm must be implemented for each blocked service flow.

The truncated binary exponential back-off algorithm successively increases the range of possible random offsets, and repeated contentions will on average result in successively longer back-off times. If a CPE is managing more than one service flow, then at any time the CPE may have backlogged requests. The load on the shared transmission resources is dynamic, and may decrease enough to accommodate new requests. Bandwidth utilization would be improved if the backlogged requests could take advantage of a low load on the shared transmission resources without unnecessarily awaiting expiry of their back-off times.

SUMMARY OF THE INVENTION

The present invention provides a method of resolving contention between a plurality of requests arriving at a headend from Customer Premises Equipment units (CPEs) in a digital communication system. A Bandwidth Allocation Map (MAP) message is transmitted from the headend to each CPE, the MAP message including acknowledgements and a previous contention period load. Upon arrival of the MAP message at each CPE, the CPEs read the acknowledgements and the previous contention period load. An offset is generated for each request for which an acknowledgement does not exist in the MAP message, using a contention resolution algorithm. If the previous contention period load is below a threshold, the offset for some or all requests for which an offset had previously been generated (backlogged requests) may be reduced. The previous contention period load is an estimate of the rate at which the headend is receiving requests, and may be defined as the number of requests which are received at the headend since the previous MAP message was transmitted, divided by the contention window size of the previous MAP message.

The present invention also provides a method of reducing backlogged requests at a CPE using a Service Status Table. The headend maintains a table which includes a reference to service flows and the level of activity of each service flow. If the level of activity at transmission resources shared by the CPEs falls below a threshold, the headend determines from the level of activity of each service flow one service flow which is most likely to have a backlogged request. The headend transmits a signal to the CPEs identifying the selected service flow, and the CPE managing the selected service flow transmits the backlogged request.

The method provides increased utilization of the shared transmission resources. By using the previous contention period load when calculating the random offset, the CPE need not wait unnecessarily long before attempting to re-send a request to the headend. Furthermore, the headend can use the table to send unicast-type Request IEs to particular CPEs during periods of low activity of the shared transmission resources.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
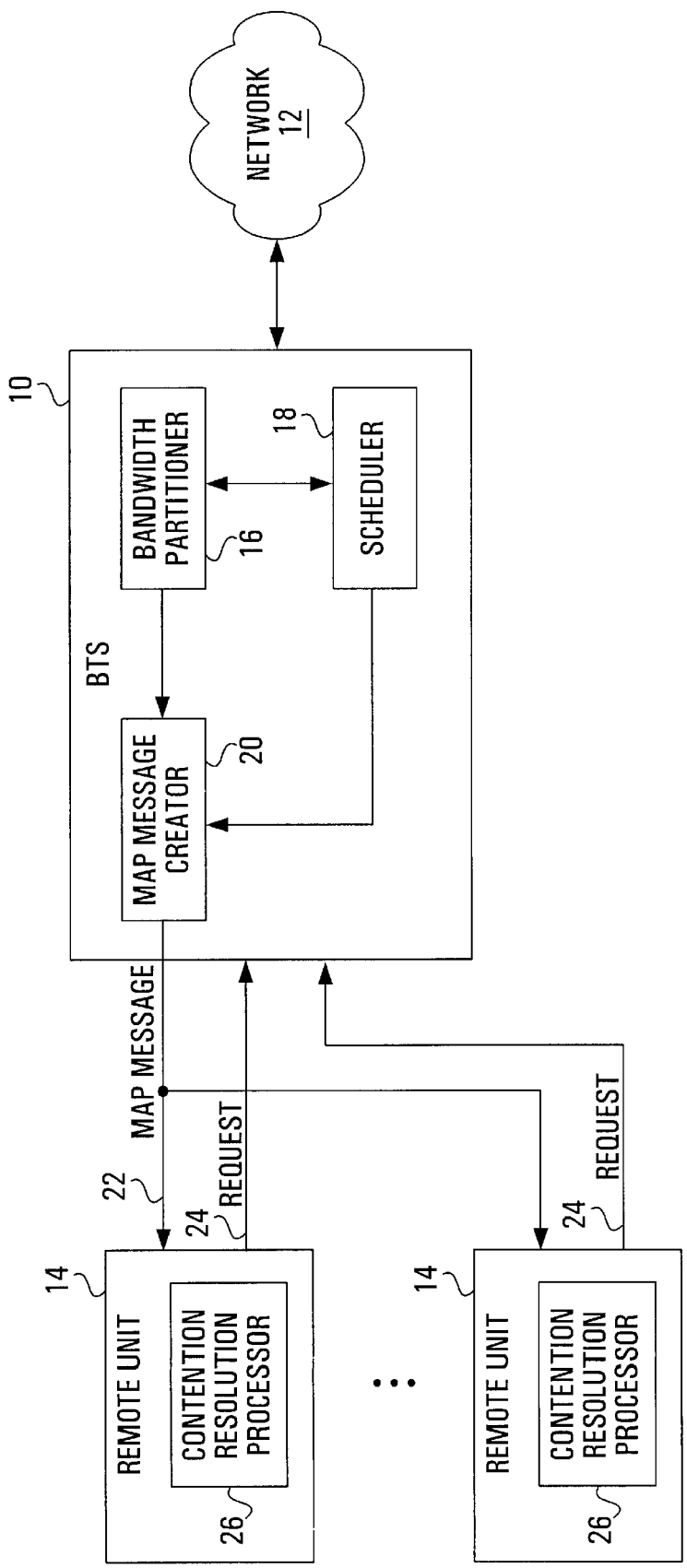
FIG. 1 is a block diagram illustrating a portion of a fixed wireless access communication system which implements the invention.
Figure 2:
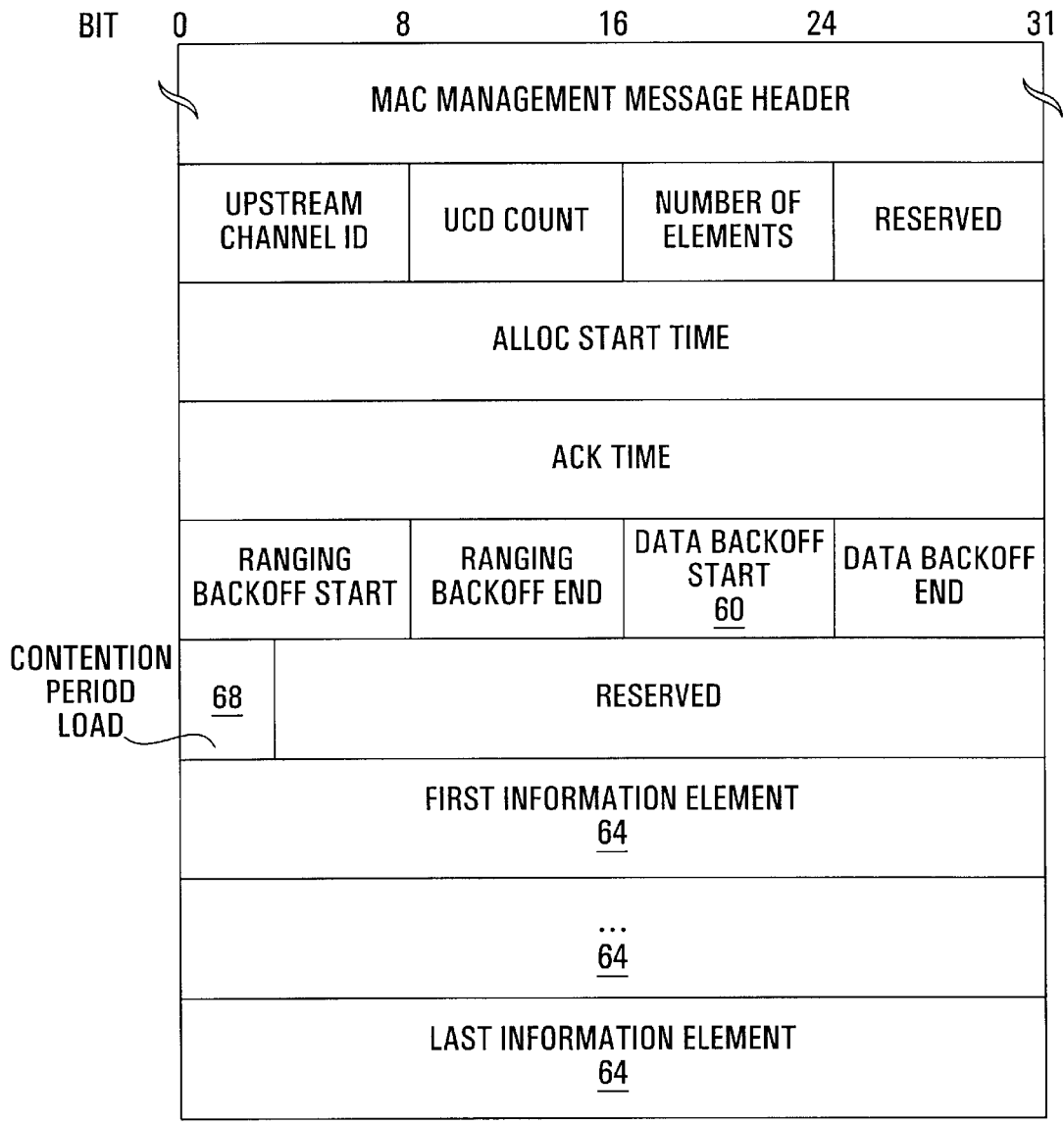
FIG. 2 is a diagram of the structure of a modified DOCSIS 1.1 MAP message.

Referring to FIG. 1, a Base station Transceiver System (BTS) 10 in a fixed wireless access communication system acts as a distribution hub between a network 12 and a plurality of remote units 14 within a coverage area of the BTS 10, although in general there may be only one remote unit 14. Interconnections between the BTS 10 and the network 12 are conventional and well known to those skilled in the art. Each remote unit 14 may manage one or more service flows. A bandwidth partitioner 16 within the BTS 10 divides upstream transmission time into intervals. A scheduler 18 within the BTS 10 schedules start and end times of the intervals. The bandwidth partitioner 16 and the scheduler 18 exchange information with each other, and pass descriptions of the intervals to a Bandwidth Allocation Map (MAP) message creator 20. The MAP message creator 20 creates a MAP message 22 substantially in conformance with DOCSIS 1.1, as shown in FIG. 2. The MAP message includes a plurality of fields, each field having a length in bits indicated by numbers along the top edge of FIG. 2. The MAP message 22 includes a Data Backoff Start field 60 and one or more Information Elements (IEs) 64. The IEs may be of different types. Some IEs may be Request IEs of either broadcast-type or unicast-type. Some IEs may be acknowledgements in the form of Data Grant IEs and Data Grant Pending IEs.

In addition to the information required by DOCSIS 1.1, the MAP message includes a previous contention period load field 68. Other than the previous contention period load field 68, the MAP message has a format identical to that specified by DOCSIS 1.1. The previous contention period load is determined by the BTS. Upstream bandwidth is conventionally divided into a stream of slots. A contention window size is defined as a number of slots which the BTS 10 allocates for contention eligible requests. The previous contention period load is defined as a number of received requests detected by the BTS since the previous MAP message was transmitted divided by the contention window size of the previous. MAP message. The previous contention period load field 68 of FIG. 2 is two bits in length, although a different length could be used. The MAP message is transmitted to the at least one remote unit 14.

Any remote unit 14 may transmit a request 24 to the BTS 10 if the MAP message 22 includes a broadcast-type Request IE. One request may be sent for each service flow managed by the remote unit 14. The BTS 10 receives and treats a request 24 in a conventional manner well known to those skilled in the art. If more than one remote unit 14 transmits a request 24 and the requests arrive at the BTS 10 simultaneously, then a contention occurs. The BTS 10 may implement a capture effect, in which the request with the highest power, usually arriving from the remote unit closest to the BTS, is detected by the BTS 10. If the BTS 10 implements a capture effect, the BTS 10 only detects one of the requests, and in a subsequent MAP message the BTS 10 sends a Data Grant IE or a Data Grant Pending IE identifying only one service flow corresponding to the detected request. If the BTS 10 does not implement a capture effect, the BTS 10 detects none of the requests, and no Data Grant IEs or Data Grant Pending IEs are sent to the remote units 14. Each remote unit 14 that does not receive acknowledgement of a request 24 in the form of either a Data Grant IE or a Data Grant Pending IE executes a contention resolution algorithm for the request. The contention resolution algorithm is carried out by a contention resolution processor 26 in the remote unit 14 and which may be a component of a larger processor.

Figure 3:
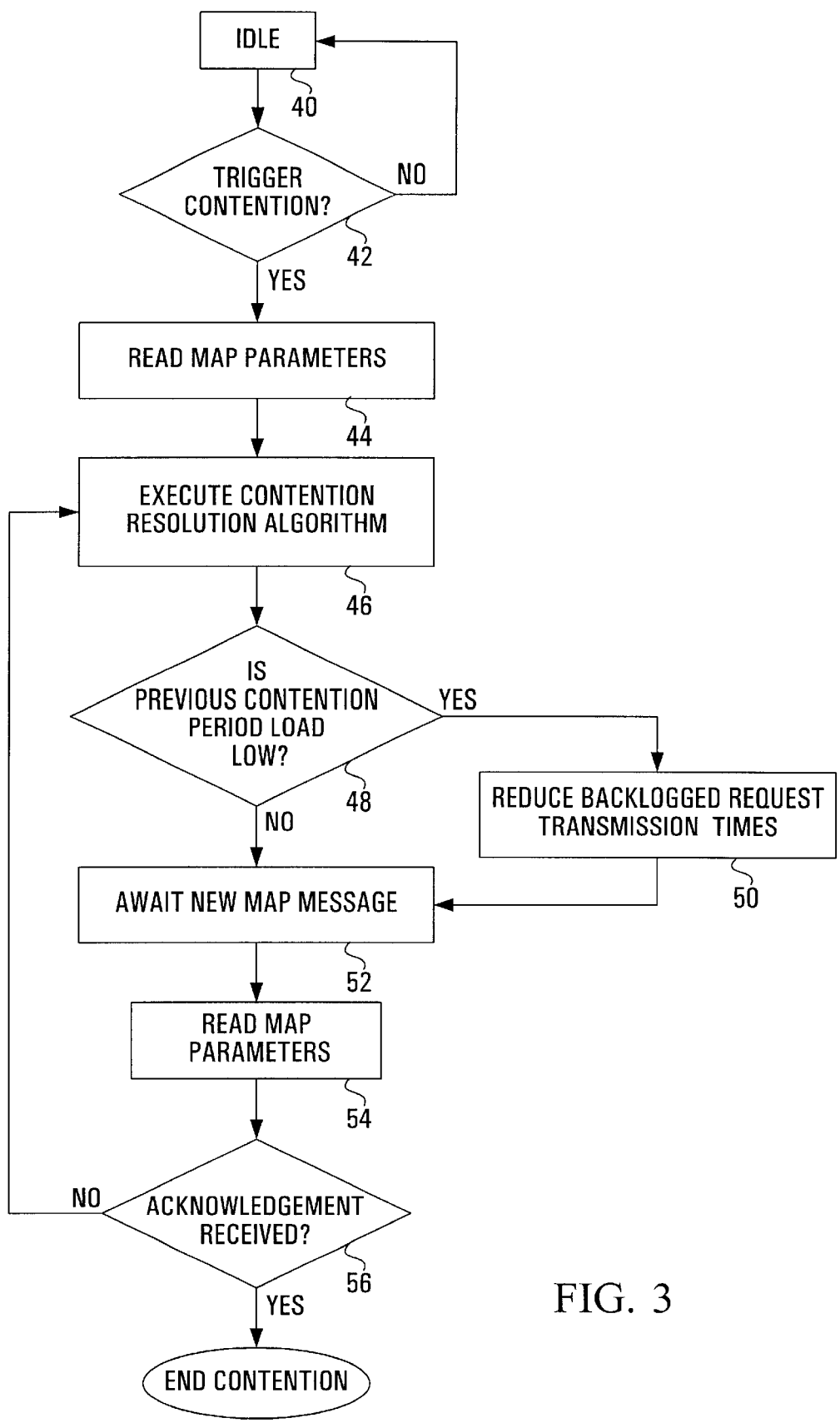
FIG. 3 is a flow chart showing the contention resolution method of the invention.

Referring to FIG. 3, the contention resolution algorithm carried out by the contention resolution processor is shown. The contention resolution algorithm is triggered at step 42 if the remote unit decides to respond to a broadcast-type Request IE by transmitting a request 24 to the BTS 10. It should be noted that the contention resolution algorithm is not triggered if the remote unit decides to respond to a unicast-type Request IE, as the BTS will have dedicated the interval specified in the Request IE for use only for a service flow specified in the Request IE and managed by the remote unit, and no contention will arise.

If the contention resolution algorithm is triggered, then at step 44 the contention resolution processor reads a set of parameters from the MAP message that contained the Request IE. The set-of parameters includes the Data Backoff Start field, the previous contention period load, and any acknowledgements in the form of Data Grant IEs or Data Grant Pending IEs. At step 46 the contention resolution processor executes a truncated binary exponential back-off algorithm, required by DOCSIS 1.1, to determine an offset. The request is not transmitted to the BTS until the remote unit detects a number of transmission opportunities equal to the offset.

A remote unit may transmit requests for more than one service flow. If contentions arose for requests sent in response to Request IEs in earlier MAP messages, indicated by no acknowledgements having been received for the requests, then the remote unit will have backlogged requests. Each backlogged request will be awaiting expiry of its own offset that was determined at step 42 when the remote unit last decided to transmit the backlogged request to the BTS. At step 48 the contention resolution processor determines whether the previous contention period load is below a threshold. If so, then at step 50 the contention resolution processor reduces the offsets of zero or more of the backlogged requests. This allows delay sensitive service flows to be transmitted during periods of low activity, rather than waiting for an unnecessarily large number of transmission opportunities to pass. After adjusting the offsets of zero or more of the backlogged requests at step 50, or if the previous contention period load is above the threshold at step 48, then at step 52 the remote unit awaits arrival of a new MAP message. When a new MAP message arrives, the contention resolution processor reads at step 54 the same set of parameters from the new MAP message as was read at step 44. At step 56 the contention resolution processor determines whether the set of parameters read at step 54 includes an acknowledgement for the request. If at step 56 an acknowledgement for the request was not received, then the contention resolution algorithm returns to step 46, where a new offset is calculated using the truncated binary exponential back-off algorithm.

The BTS 10 may also, or alternatively, maintain a Service Status Table (SST). The SST includes information indicating an activity level of each service flow within a coverage area of the BTS. For example, the SST can include a level of activity of each service flow and a last time each service flow transmitted a request. When a remote unit transmits a packet for a service flow to the BTS, the packet includes a header which includes a conventional field indicating how many packets still remain to be transmitted during that transmission. The BTS determines the level of activity of the service flow from the conventional field, and populates the SST. During a period of low activity in the shared transmission resources, the BTS transmits unicast-type Request IEs to service flows whose level of activity in the SST indicates are likely to have a backlogged request. A remote unit which receives a unicast-type Request IE specifying a service flow which the remote unit is managing abandons the contention resolution algorithm for that service flow and transmits a request using the transmit opportunity indicated in the unicast-type Request IE.

The invention has been described with respect to a fixed wireless communications system. The invention can also be implemented in other digital communication systems, such as a mobile communication system or a cable television communication system. The remote unit is then replaced more generally by any Customer Premises Equipment unit (such as a mobile unit or a cable modem) and the BTS is replaced more generally by any headend (such as a Cable Modem Termination System).

The invention is not limited to communication systems employing a truncated binary exponential back-off algorithm as a contention resolution algorithm. Any contention resolution algorithm that does not distinguish between high priority traffic (that is, delay sensitive traffic) and low priority traffic can be improved by modifications in accordance with the method of the invention. The invention may also be implemented in communication systems employing a communication protocol other than DOCSIS 1.1, as long as the communication protocol can be modified to include signalling of the contention period load to the CPE units.

The previous contention period load has been defined as the number of received requests detected by the BTS since the previous MAP message was transmitted, divided by the contention window size of the previous MAP message. More generally, the previous contention period load is an estimate of a rate at which requests are being received by the BTS.

What has been described is merely illustrative of the application of the principles of the invention. Other arrangements and methods can be implemented by those skilled in the art without departing from the spirit and scope of the present invention.

I claim:

1. In a digital communication system, a method of resolving contention between a plurality of requests arriving at a headend from at least one Customer Premises Equipment unit (CPE), the method comprising the steps of:

transmitting a Bandwidth Allocation Map (MAP) message from the headend to each CPE, the MAP message including zero or more acknowledgments and a previous contention period load;

reading the acknowledgements and the previous contention period load, upon arrival of the MAP message at each CPE;

generating an offset for each request for which an acknowledgement does not exist in the MAP message, using a contention resolution algorithm; and if the previous contention period load is below a threshold, reducing an offset for zero or more requests for which an offset had previously been generated.

2. The method of claim 1 wherein the previous contention period load is an estimate of a rate at which the headend is receiving requests.

3. The method of claim 2 wherein the previous contention period load is defined as a number of requests which are received at the headend since a previous MAP message was transmitted, divided by a contention window size of the previous MAP message.

4. The method of claim 1 wherein the contention resolution algorithm is a truncated binary exponential back-off algorithm.

5. The method of claim 4 wherein the digital communication system is a fixed wireless access communication system.

6. The method of claim 4 wherein the digital communication system is a mobile communication system.

7. The method of claim 4 wherein the digital communication system is a cable television communication system.

8. The method of claim 1 wherein the digital communication system is a fixed wireless access communication system.

9. The method of claim 1 wherein the digital communication system is a mobile communication system.

10. The method of claim 1 wherein the digital communication system is a cable television communication system.

11. A headend for a digital communication system, the headend comprising a message creator arranged to create a Bandwidth Allocation Map (MAP) message and means arranged to transmit the MAP message to at least one Customer Premises Equipment unit (CPE), wherein the MAP message includes:

zero or more acknowledgements; and a previous contention period load.

12. The headend of claim 11 wherein the headend receives at least one request from the at least one CPE, and the previous contention period load is an estimate of a rate at which the headend is receiving requests.

13. The headend of claim 12 wherein the previous contention period load is defined as a number of requests which are received at the headend since a previous MAP message was transmitted, divided by a contention window size of the previous MAP message.

14. The headend of claim 12 wherein the headend is a Base station Transceiver System within a fixed wireless access communication system.

15. The headend of claim 12 wherein the headend is a Base station Transceiver System within a mobile communication system.

16. The headend of claim 12 wherein the headend is a Cable Modem Termination System within a cable television communication system.

17. The headend of claim 11 wherein the headend is a Base station Transceiver System within a fixed wireless access communication system.

18. The headend of claim 11 wherein the headend is a Base station Transceiver System within a mobile communication system.

19. The headend of claim 11 wherein the headend is a Cable Modem Termination System within a cable television communication system.

20. A Customer Premises Equipment (CPE) unit for a digital communication system, the CPE unit including a contention resolution processor and transmitting requests to a headend, the contention resolution processor including instructions for:

reading zero or more acknowledgements and a previous contention period load from a Bandwidth Allocation Map (MAP) message transmitted by the headend;

generating an offset for each request for which an acknowledgement does not exist in the MAP message, using a contention resolution algorithm; and reducing an offset for zero or more requests for which an offset had previously been generated, in the event that the previous contention period load is below a threshold.

21. The CPE unit of claim 20 wherein the previous contention period load is an estimate of a rate at which the headend is receiving requests from the CPB unit and from zero or more additional CPE units.

22. The CPE unit of claim 21 wherein the previous contention period load is defined as a number of requests from the CPE unit and from zero or more additional CPE units which are received at the headend since a previous MAP message was transmitted, divided by a contention window size of the previous MAP message.

23. The CPE unit of claim 20 wherein the contention resolution algorithm is a truncated binary exponential back-off algorithm.

24. The CPE unit of claim 23 wherein the CPE unit is a remote unit within a fixed wireless access communication system.

25. The CPE unit of claim 23 wherein the CPE unit is a mobile unit within a mobile communication system.

26. The CPE unit of claim 23 wherein the CPE unit is a cable modem within a cable television communication system.

27. The CPE unit of claim 20 wherein the CPE unit is a remote unit within a fixed wireless access communication system.

28. The CPE unit of claim 20 wherein the CPE unit is a mobile unit within a mobile communication system.

29. The CPE unit of claim 20 wherein the CPE unit is a cable modem within a cable television communication system.

30. A contention resolution processor including instructions for:

reading zero or more acknowledgements and a previous contention period load from a Bandwidth Allocation Map (MAP) message;

generating an offset for a request for which an acknowledgement does not exist in the MAP message, using a contention resolution algorithm; and reducing an offset for zero or more requests for which an offset had previously been generated, in the event that the previous contention period load is below a threshold.

31. The contention resolution processor of claim 30 wherein the previous contention period load is an estimate of a rate at which a headend is receiving requests from at least one Customer Premises Equipment unit (CPE).

32. The contention resolution processor of claim 31 wherein the previous contention period load is defined as a number of requests from at least one CPE unit which are received at the headend since a previous MAP message was transmitted, divided by a contention window size of the previous MAP message.

33. The contention resolution processor of claim 30 wherein the contention resolution algorithm is a truncated binary exponential back-off algorithm.

34. In a digital communication system including at least one Customer Premises Equipment unit (CPE) and a headend, a method of reducing backlogged requests at a CPE comprising the steps of:

maintaining a table at the headend, the table including a reference to at least one service flow and a level of activity of each service flow;

if a level of activity at transmission resources shared by the at least one CPE falls below a threshold, determining from the level of activity of each service flow a selected service flow which is most likely to have a backlogged request;

transmitting a signal to the at least one CPE identifying the selected service flow; and transmitting the backlogged request.

35. The method of claim 34 wherein the level of activity of a service flow is determined from a field in a packet header received from the service flow, the field indicating how many packets remain to be transmitted.

* * * * *

UNITED STATES PATENT AND TRADEMARK OFFICE
CERTIFICATE OF CORRECTION

PATENT NO. : 6,801,537 B1
DATED : October 5, 2004
INVENTOR(S) : Osama M. Kubbar

It is certified that error appears in the above-identified patent and that said Letters Patent is hereby corrected as shown below:

Title page,
Item [54], Title, should read -- AN ADAPTIVE... --

Column 7,
Line 46, "...CPB..." should read -- ...CPE... --

Signed and Sealed this

Third Day of May, 2005

JON W. DUDAS
*Director of the United States Patent and Trademark Office*